(12) United States Patent
Sanz Martinez et al.

(10) Patent No.: US 11,524,770 B2
(45) Date of Patent: Dec. 13, 2022

(54) ACTIVE LAMINAR FLOW CONTROL PLENUM PANEL ARRANGEMENTS AND INSTALLATION METHODS

(71) Applicant: Rohr, Inc., Chula Vista, CA (US)

(72) Inventors: Pablo T. Sanz Martinez, San Diego, CA (US); Johann Steven Schrell, San Diego, CA (US); Thomas Paolini, Felton, CA (US)

(73) Assignee: Rohr, Inc., Chula Vista, CA (US)

( * ) Notice: Subject to any disclaimer, the term of this patent is extended or adjusted under 35 U.S.C. 154(b) by 1112 days.

(21) Appl. No.: 16/147,145

(22) Filed: Sep. 28, 2018

(65) Prior Publication Data

US 2020/0102084 A1 Apr. 2, 2020

(51) Int. Cl.
| | |
|---|---|
| B64C 21/02 | (2006.01) |
| B64C 1/12 | (2006.01) |
| B64C 21/06 | (2006.01) |
| B64D 29/00 | (2006.01) |
| B64C 1/00 | (2006.01) |
| B64D 33/02 | (2006.01) |

(52) U.S. Cl.
CPC ............ *B64C 21/02* (2013.01); *B64C 1/12* (2013.01); *B64C 21/06* (2013.01); *B64D 29/00* (2013.01); *B64D 33/02* (2013.01); *B64C 2001/0072* (2013.01); *B64C 2230/22* (2013.01); *B64D 2033/0226* (2013.01)

(58) Field of Classification Search
CPC ......... B64C 1/12; B64C 21/02; B64C 21/025; B64C 21/04; B64C 21/06; B64C 2230/22; B64D 2033/0026
See application file for complete search history.

(56) References Cited

U.S. PATENT DOCUMENTS

| | | | |
|---|---|---|---|
| 2,742,247 A | 4/1956 | Lachmann | |
| 3,194,518 A | 7/1965 | Walsh | |
| 4,556,591 A * | 12/1985 | Bannink, Jr. | ........... B29C 66/71 403/267 |
| 4,858,721 A * | 8/1989 | Autie | ...................... F02K 1/827 181/224 |
| 5,316,032 A | 5/1994 | DeCoux | |
| 5,366,177 A | 11/1994 | DeCoux | |

(Continued)

FOREIGN PATENT DOCUMENTS

| | | |
|---|---|---|
| DE | 936618 | 12/1955 |
| EP | 0585561 | 3/1994 |

(Continued)

OTHER PUBLICATIONS

European Patent Office, European Search Report dated Feb. 4, 2020 in Application No. 19195429.6.

(Continued)

*Primary Examiner* — Nicholas McFall (74) *Attorney, Agent, or Firm* — Snell & Wilmer L.L.P.

(57) ABSTRACT

A panel for an active laminar flow control arrangement may comprise a longitudinal wall and one or more division walls extending from the longitudinal wall and extending between the first end and the second end. The panel may be coupled to a nacelle outer skin via a plurality of adhesive fasteners pre-installed onto an inner surface of the outer skin and onto stiffeners and/or stringers associated with the outer skin.

17 Claims, 10 Drawing Sheets

(56) References Cited

U.S. PATENT DOCUMENTS

| | | | |
|---|---|---|---|
| 5,368,258 A * | 11/1994 | Johnson | B64C 21/06 244/209 |
| 8,783,624 B2 | 7/2014 | Koppelman et al. | |
| 9,663,238 B2 | 5/2017 | Kane et al. | |
| 2008/0111024 A1 | 5/2008 | Lee et al. | |
| 2010/0276548 A1 | 11/2010 | Porte et al. | |
| 2011/0005188 A1 | 1/2011 | Roger | |
| 2016/0263878 A1 | 9/2016 | Weaver et al. | |
| 2016/0311520 A1 | 10/2016 | Khidekel | |
| 2017/0096230 A1 | 4/2017 | Surply et al. | |
| 2019/0202566 A1 | 7/2019 | Heckl | |

FOREIGN PATENT DOCUMENTS

| | | |
|---|---|---|
| EP | 1232944 | 8/2002 |
| EP | 3093236 | 11/2016 |
| EP | 3159259 | 4/2017 |
| EP | 3205491 | 8/2017 |
| GB | 2252076 | 7/1992 |
| WO | 9221560 | 12/1992 |

OTHER PUBLICATIONS

European Patent Office, European Search Report dated Feb. 26, 2020 in Application No. 19191006.6.

European Patent Office, European Search Report dated Jan. 27, 2020 in Application No. 19195211.8.

European Patent Office, European Office Action dated Oct. 27, 2021 in Application No. 19195429.6.

European Patent Office, European Office Action dated Oct. 27, 2021 in Application No. 19195211.8.

European Patent Office, European Office Action dated Apr. 13, 2021 in Application No. 19191006.6.

Pablo T. Sanz Martinez et al, U.S. Appl. No. 16/147,064, filed Sep. 28, 2018 and entitled "Active Laminar Flow Control Structural Plenums Fastened".

Pablo T. Sanz Martinez et al, U.S. Appl. No. 16/147,125, filed Sep. 28, 2018 and entitled "Active Laminar Flow Control Plenum Panel Arrangement".

USPTO, Pre-Interview First Office Action dated Mar. 9, 2022 in U.S. Appl. No. 16/147,125.

USPTO, Pre-Interview First Office Action dated Feb. 15, 2022 in U.S. Appl. No. 16/147,064.

USPTO; Notice of Allowance dated Apr. 18, 2022 in U.S. Appl. No. 16/147,064.

USPTO; Notice of Allowance dated May 4, 2022 in U.S. Appl. No. 16/147,125.

* cited by examiner

ACTIVE LAMINAR FLOW CONTROL PLENUM PANEL ARRANGEMENTS AND INSTALLATION METHODS

FIELD

The present disclosure relates to laminar flow control for engine aircraft engine nacelles, and more particularly to systems and methods for plenum structures for laminar flow control systems.

BACKGROUND

A nacelle is the housing for a turbofan gas turbine engine used to power, for example, a commercial airliner. The nacelle and the engine together are referred to as the propulsion system or power plant of the aircraft. The nacelle forms the external aerodynamic surfaces of the propulsion system, and also helps form the duct for the bypass air from the fan, as well as encloses all the components and auxiliary devices surrounding and attached to the engine. The nacelle may also optionally provide a reverse thrust means to generate reverse thrust to slow the aircraft, for example during landing.

SUMMARY

A panel for an active laminar flow control arrangement is disclosed, comprising a longitudinal wall extending between a first end and a second end of the panel and extending between a first side and a second side of the panel, and a division wall extending from the longitudinal wall and extending between the first end and the second end.

In various embodiments, the panel further comprises an indentation formed into the panel and extending from the longitudinal wall and intersecting the division wall.

In various embodiments, the panel further comprises a sealant disposed on an end of the division wall.

In various embodiments, the division wall is T-shaped.

In various embodiments, the panel further comprises a second division wall extending from the longitudinal wall and oriented parallel with respect to the division wall.

In various embodiments, the panel further comprises a first plurality of apertures disposed along the division wall.

In various embodiments, the panel further comprises a second plurality of apertures disposed along a perimeter of the panel.

In various embodiments, the panel further comprises a third plurality of apertures disposed in the longitudinal wall between the division wall and the second division wall.

In various embodiments, the panel is made from a composite material.

In various embodiments, the longitudinal wall and the division wall comprise a single, monolithic piece.

An active laminar flow control arrangement is disclosed, comprising an outer skin having an inner surface, an outer surface, and a perforated area, a panel coupled to the inner surface, comprising a longitudinal wall extending between a first end and a second end of the panel and extending between a first side and a second side of the panel, and a division wall extending from the longitudinal wall and extending between the first end and the second end.

In various embodiments, the inner surface is in fluid communication with the outer surface via the perforated area.

In various embodiments, the active laminar flow control arrangement further comprises a sealant disposed on an end of the division wall and the inner surface.

In various embodiments, the longitudinal wall is oriented substantially parallel with the outer skin.

In various embodiments, the active laminar flow control arrangement further comprises a first plurality of fasteners couple.

In various embodiments, the active laminar flow control arrangement further comprises an indentation formed into the panel and extending from the longitudinal wall and intersecting the division wall.

In various embodiments, the active laminar flow control arrangement further comprises a plurality of adhesive fasteners coupled between the outer skin and the panel.

In various embodiments, the active laminar flow control arrangement further comprises a first plenum and a second plenum, the first plenum is divided from the second plenum via the division wall.

A method of installing a laminar flow control arrangement onto a nacelle inlet is disclosed, comprising disposing a sealant over an end of a division wall of a panel, coupling a first plurality of adhesive fasteners onto an inner surface of an outer skin, coupling a second plurality of adhesive fasteners onto a stiffener, and disposing the panel over the first plurality of fasteners and the second plurality of fasteners.

In various embodiments, the method further comprises compressing the sealant between the outer skin and the division wall, wherein the division wall divides a cavity to at least partially define a first plenum and a second plenum.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

An active laminar flow control arrangement is disclosed herein, comprising a panel for an inlet outer skin. The outer skin, associated stiffeners, and panel may define a plurality of plenums for active laminar flow control. The panel may be a one-piece panel thereby increasing ease of installation and decreasing the number of parts in the arrangement. Furthermore, the panel may be coupled to the outer skin by pre-installing adhesive fasteners to the outer skin and associated stiffeners. The active laminar flow control arrangement may be adaptable to various nacelle inlet designs.

Xyz-axes are provided in certain figures described herein for ease of illustration.

Figure 1A:
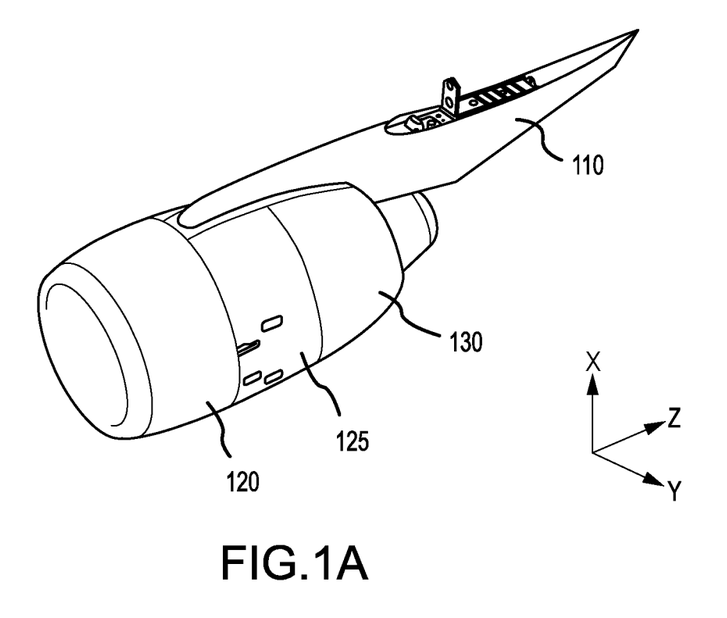
FIG. 1A illustrates a perspective view of a propulsion system and its elements, in accordance with various embodiments.
Figure 1B:
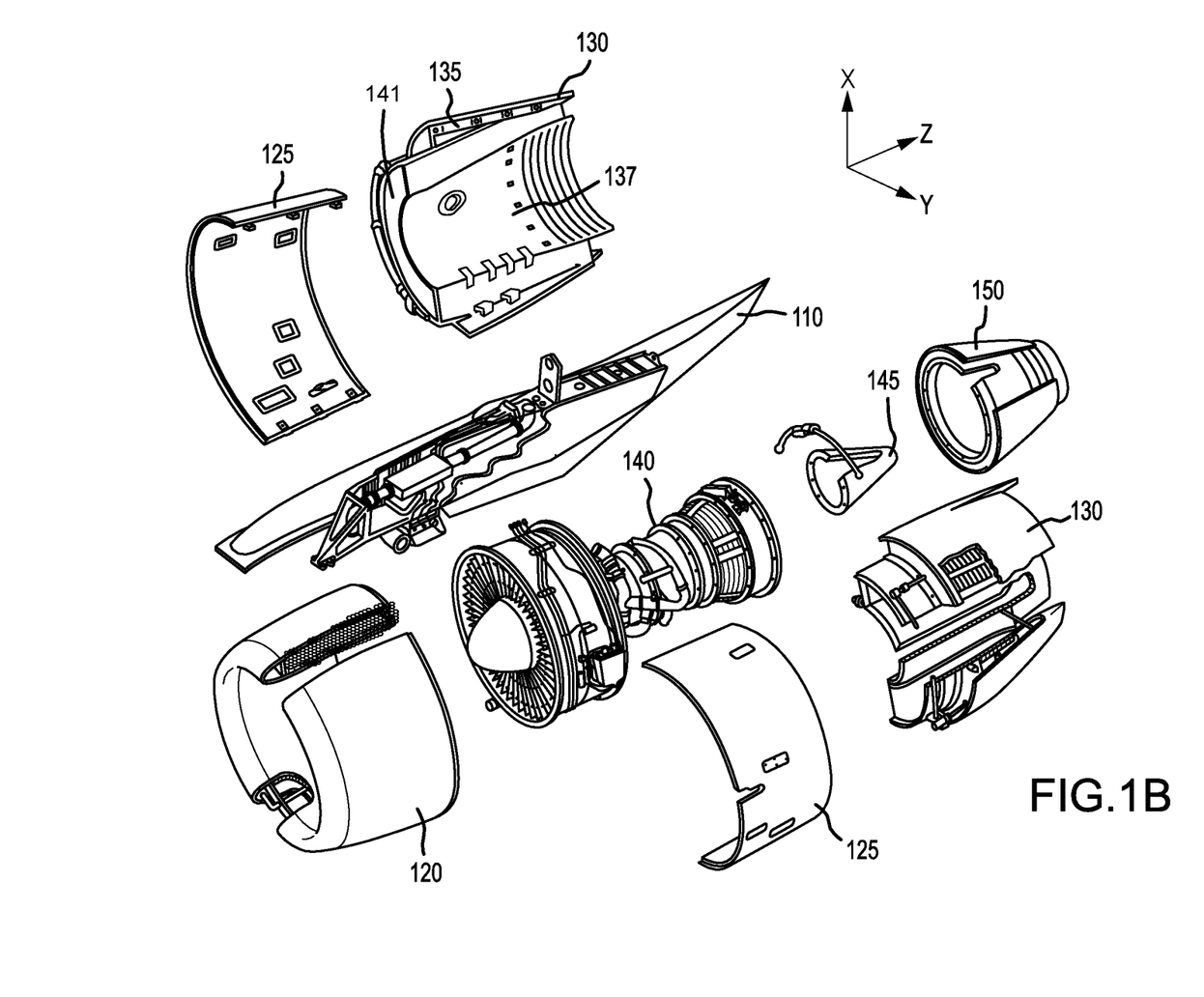
FIG. 1B illustrates an exploded view of the propulsion system and its elements of FIG. 1A, in accordance with various embodiments.

With reference to FIGS. 1A and 1B, a turbofan propulsion system for a commercial jetliner may include an engine 140, a pylon 110, and a nacelle package (also referred to herein as a nacelle) 100. The typical nacelle package, or more simply a nacelle, may comprise an inlet 120, a fan cowl 125, a thrust reverser 130, and an exhaust system including an exhaust cone 145, and exhaust nozzle 150. The nacelle 100 surrounds the engine providing smooth aerodynamic surfaces for airflow around and into the engine. The nacelle also helps define a bypass air duct through the propulsion system.

A fan draws and directs a flow of air into and through the propulsion system. After the fan, the air is divided into two principal flowpaths, one flowpath through the engine core, and another flowpath through a bypass air duct. The engine core flowpath is directed into the engine core and initially passes through a compressor that increases the air flow pressure, and then through a combustor where the air is mixed with fuel and ignited. The combustion of the fuel and air mixture causes a series of turbine blades at the rear of the engine core to rotate, and to drive the engine's rotor and fan. The high-pressure exhaust gases from the combustion of the fuel and air mixture are thereafter directed through an exhaust nozzle at the rear of the engine for thrust.

The bypass air flowpath includes air that is directed around the engine core in a duct or ducts defined by the nacelle. The bypass air exits the duct at a nozzle at the aft end of the nacelle for thrust. In turbofan engines, the bypass flow typically provides a large percentage of the thrust for an aircraft. The bypass air ducts in the nacelle may be C-shaped, and may be principally defined by the exterior surface of the inner fixed structure (IFS) 137 and the inside surface of the outer sleeve 141. If the nacelle includes a typical thrust reverser, the thrust reverser blocks bypass air in the bypass air duct from reaching the nozzle, and instead redirects the bypass air to exit the duct in a forward direction of the aircraft to generate reverse thrust.

The engine 140 may be mounted to pylon 110 in two places. One of these at the aft end of the pylon 110, over the engine turbine case, and in one of two places at the forward end of pylon 110: the engine core (core mount) or the engine fan case (fan mount). Pylon 110 transmits structural loads (including thrust) between engine 140 and a wing.

The thrust reverser 130 may comprise two halves generally configured to surround the engine core. The thrust reverser 130 may be hinged to the pylon 110 via one or more hinges. The thrust reverser 130 comprises an IFS 137 and an outer sleeve 141. The IFS generally surrounds the engine core. As used herein, the outer sleeve 141, though it may have any shape, may generally be a C shaped structure. An exterior surface of the outer sleeve is external to the nacelle. An interior surface of the outer sleeve 141, along with the IFS 137, partially defines a cold flow path of the propulsion system of the aircraft. The IFS 137 and the outer sleeve 141 are typically coupled together and attached to the pylon 110 via a hinge beam 135. As used herein, the IFS 137 is generally referred to as an IFS; however it should be appreciated that a first IFS half may be configured to partially surround an engine core and a second IFS half may be configured to substantially partially surround the remaining engine core.

In operation, an ambient air flow 102 on the exterior of the nacelle 100 generates drag. The drag force tends to increase fuel consumption. Accordingly, it is desirable to minimize the drag.

If the flow around the nacelle 100 is laminar the drag force will be reduced compared to a turbulent flow. Aircraft and nacelle designers have utilized nacelle external aerodynamic shapes that maintain a natural laminar flow over a portion of the nacelle 100. By carefully selecting the aerodynamic profile, natural laminar flow can be achieved. The portion where it is desired to achieve laminar flow should be clean of debris and aerodynamically smooth (e.g., fastener heads should be flush and parallel with the surrounding surface). Steps and gaps can cause the laminar flow to trip and transition to turbulent flow. Other active or hybrid natural/active techniques have been proposed for achieving and maintaining laminar flow on an aircraft nacelle and other aircraft surfaces. One such technique is through boundary layer ingestion or suction where the boundary layer next to the aircraft surface is pulled through small holes in the surface to remove the low energy boundary layer and regenerate it or maintain it at a minimum or near minimum energy level. Active or hybrid laminar flow techniques may achieve and maintain laminar flow more consistently than natural means alone, and may be able to extend further aft the region of nacelle 100 which has laminar flow.

Figure 2:
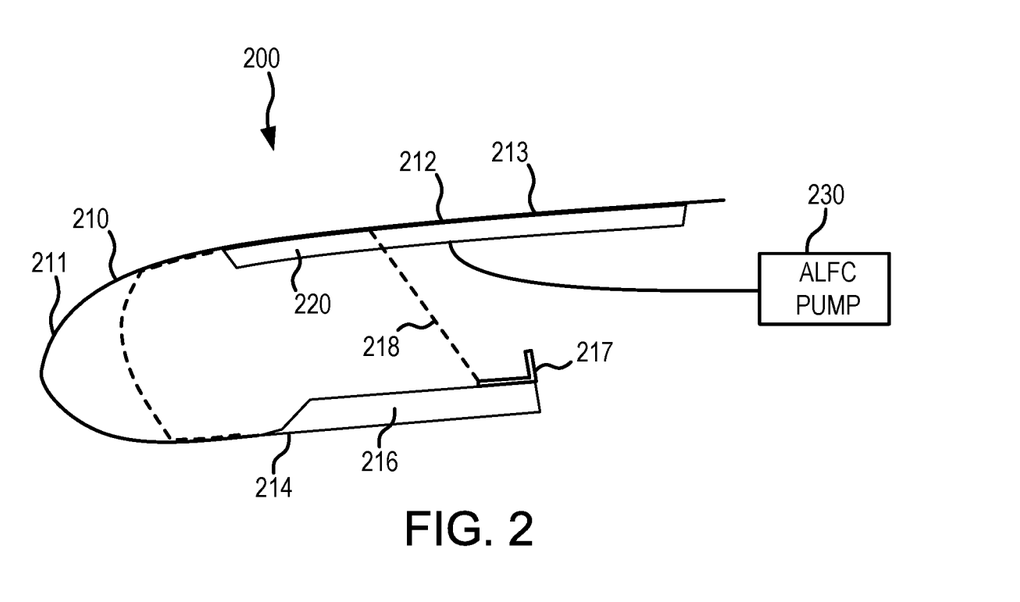
FIG. 2 illustrates a schematic section view of a nacelle inlet having an active laminar flow control arrangement, in accordance with various embodiments.

With reference to FIG. 2, a schematic view of an active laminar flow control arrangement 200 is illustrated, in accordance with various embodiments. In various embodiments, active laminar flow control arrangement 200 includes a nacelle inlet 210. Nacelle inlet 210 may be similar to nacelle inlet 120 of FIG. 1. A laminar flow control duct arrangement 220 may be coupled to nacelle inlet 210. Laminar flow control duct arrangement 220 may be in fluid communication with a plurality of orifices (i.e., perforations) 213 disposed in the outer skin 212 of nacelle inlet 210. In various embodiments, outer skin 212 defines an outer aerodynamic surface of nacelle inlet 210. Laminar flow control duct arrangement 220 may be in fluid communication with a pump 230 whereby an ambient airflow 202 is drawn into laminar flow control duct arrangement 220 from outside of nacelle inlet 210 through orifices 213. Pump 230 may be a fluid (e.g., air) pump. Pump 230 may be mounted to a fan case. It is appreciated that the location of pump 230 is not particularly limited. In this manner, a laminar or near laminar flow may be maintained over nacelle inlet 210, thereby increasing the aerodynamic performance of the nacelle inlet 210. It is appreciated that the present disclosure may be useful for an active laminar flow control system for any desirable aerodynamic surface of an aircraft or any suitable portion of a nacelle, such as the fan cowl for example.

In various embodiments, nacelle inlet 210 comprises an inner barrel 215. Nacelle inlet 210 may comprise a nose lip 211. Inner barrel 215 may be coupled to outer skin 212 via nose lip 211. In various embodiments, inner barrel 215 may be acoustically treated. In various embodiments, nacelle inlet 210 includes an acoustic liner 216 coupled to inner barrel 215. Nacelle inlet 210 may include an attachment ring 217. Nacelle inlet 210 may be configured to be coupled to an adjacent fan case via attachment ring 217. Nacelle inlet 210 may include an aft bulkhead 218 extending between attachment ring 217 and outer skin 212.

Figure 3:
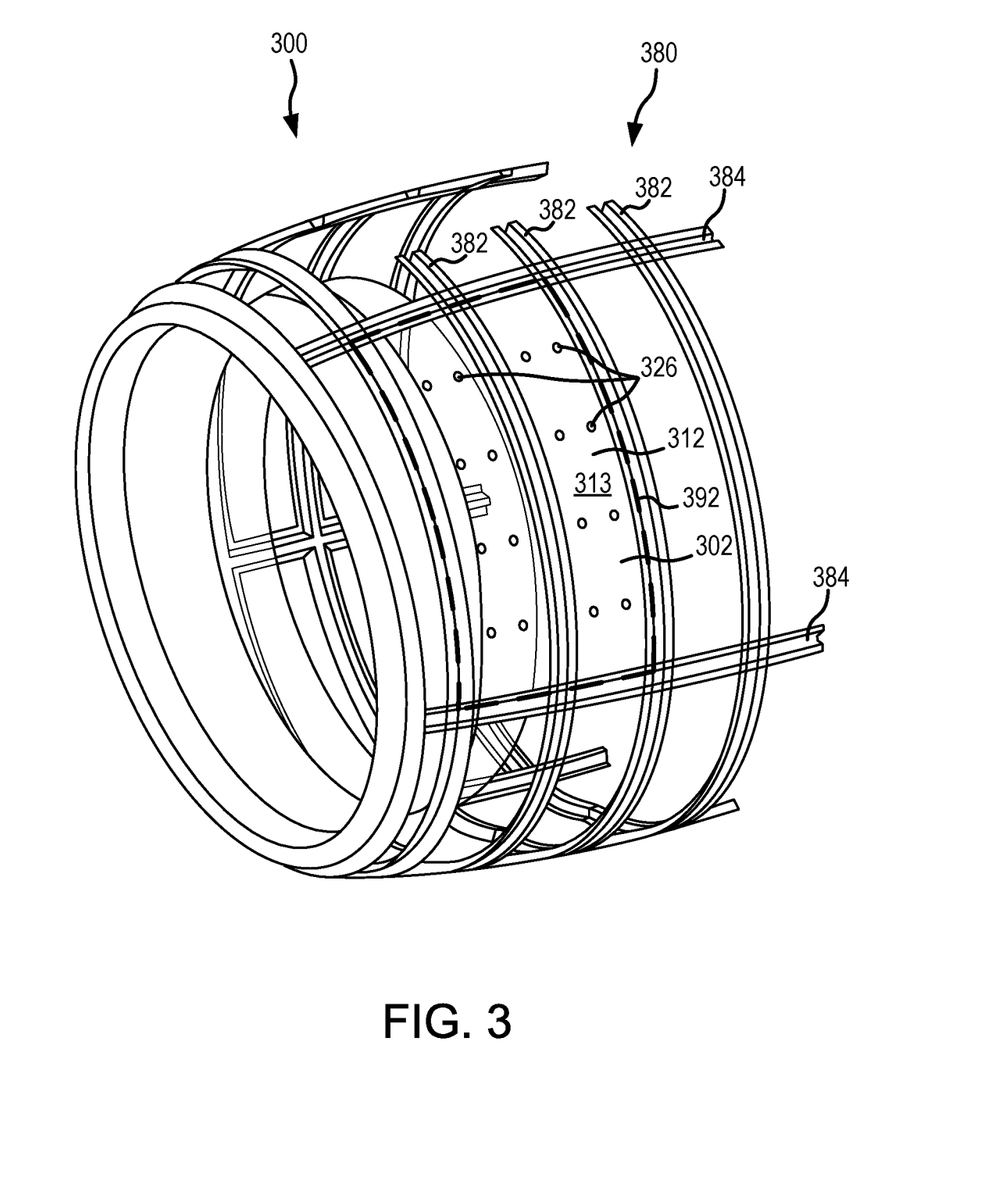
FIG. 3 illustrates a perspective view of an outer skin panel installed onto a nacelle inlet frame structure, in accordance with various embodiments.

With reference to FIG. 3, a perspective view of a nacelle inlet 300 is illustrated, in accordance with various embodiments. Nacelle inlet 300 may comprise a structural support arrangement 380 comprising a plurality of circumferentially extending stiffeners 382 and a plurality of longitudinally extending stringers 384. The plurality of stiffeners 382 and the plurality of stringers 384 may be joined at their intersections to provide a frame over which an outer skin 312 is disposed to provide an aerodynamically smooth outer surface 313 for the nacelle inlet 300. Outer skin 312 may comprise one or more outer skin panels 302, generally outlined by dashed line 392 in the illustrated embodiment. Outer skin 312 may comprise a plurality of pre-installed adhesive fasteners 326 for attaching an active laminar flow control plenum panel thereto, as will be described in further detail herein.

Figure 4:
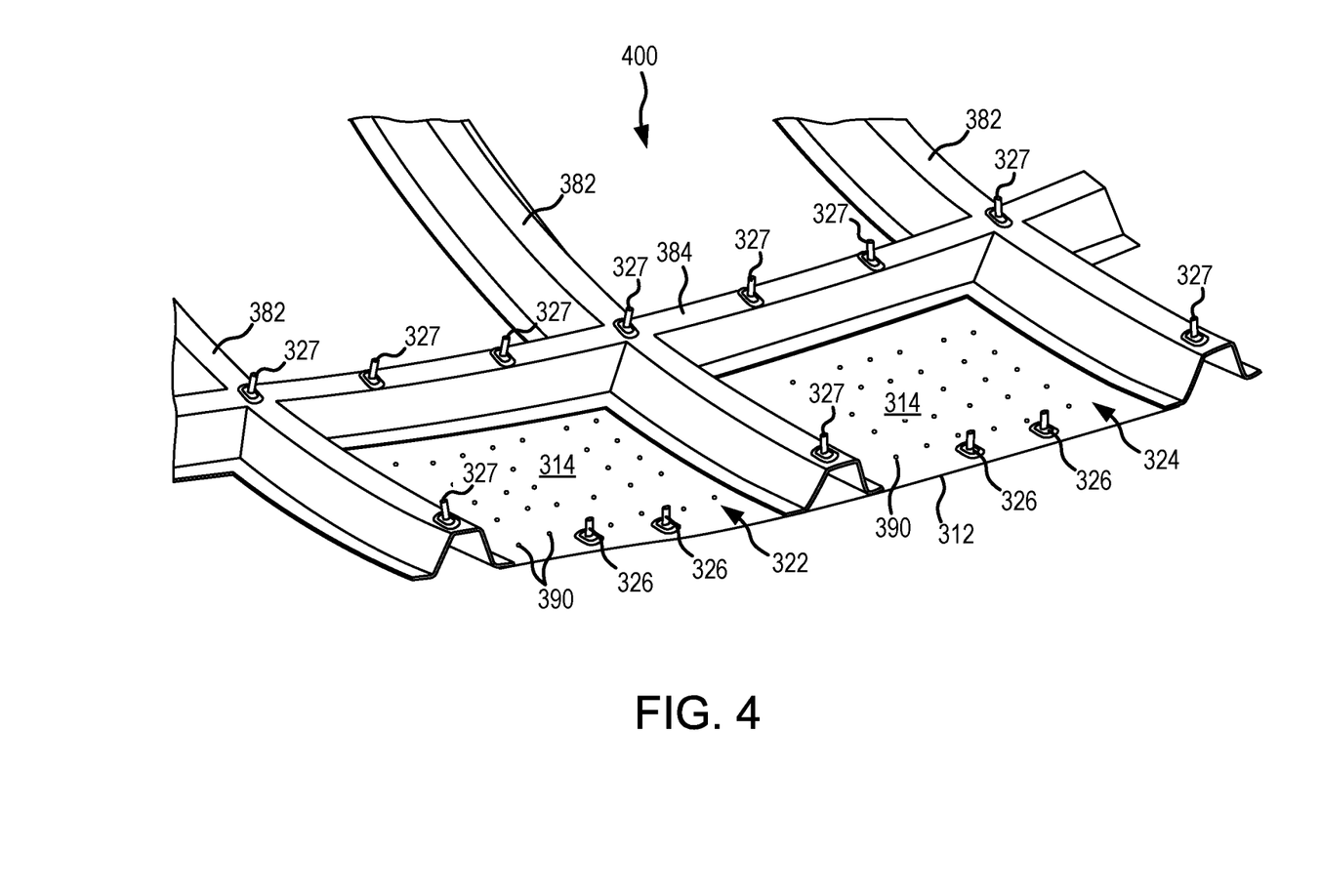
FIG. 4 illustrates a perspective view of an inner surface of a nacelle inlet having a plurality of fasteners for receiving a panel, in accordance with various embodiments.

With reference to FIG. 4, a perspective view of an active laminar flow control arrangement 400 looking at the inner surface 314 of outer skin 312 with a plenum panel omitted for clarity purposes is illustrated, in accordance with various embodiments. Inner surface 314 may be coupled to plurality of stiffeners 382 and plurality of stringers 384. Outer skin 312 may comprise a perforated area comprising a plurality of perforations 390 whereby inner surface 314 is placed in fluid communication with outer surface 313 (see FIG. 3).

In various embodiments, plurality of stiffeners 382, plurality of stringers 384, and inner surface 314 of outer skin 312 may define one or more cavities, such as cavity 322 and cavity 324. Cavity 322 and cavity 324 may be in fluid communication with outer surface 313 (see FIG. 3) via perforations 390.

A plurality of adhesive fasteners 326 may be coupled to inner surface 314 of outer skin 312. Plurality of adhesive fasteners 326 may be disposed entirely inward from outer skin 312. Stated differently, adhesive fasteners 326 do not extend into outer skin 312, in accordance with various embodiments. A plurality of adhesive fasteners 327 may be coupled to inner surface 314 of outer skin 312 plurality of stiffeners 382 and plurality of stringers 384. Plurality of fasteners 327 may be similar to plurality of fasteners 326. Sheer forces may be transferred between panel 430 and outer skin 312 via fasteners 326. Sheer forces may be transferred between panel 430 and plurality of stiffeners 382 and plurality of stringers 384 via fasteners 327.

Figure 5A:
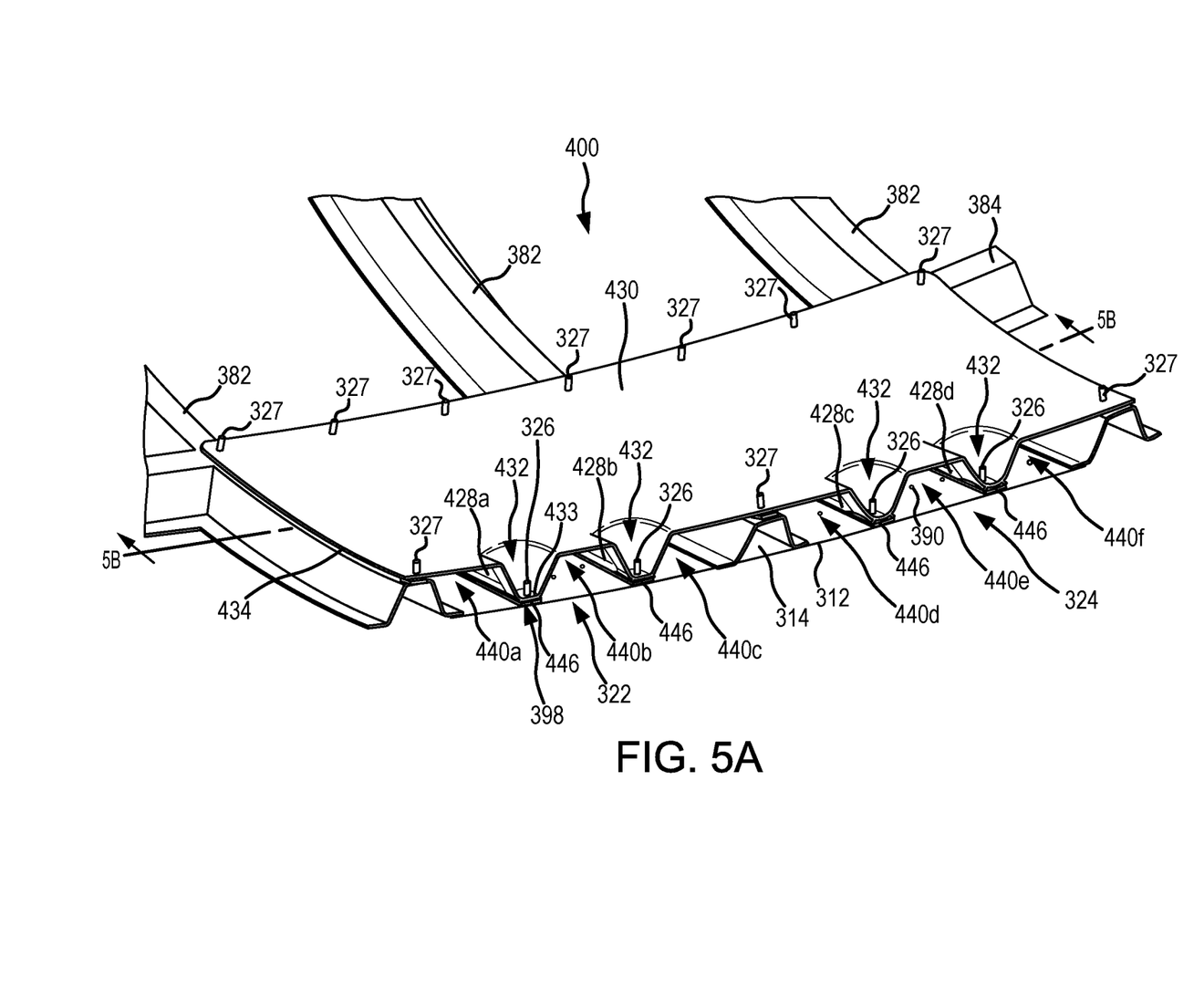
FIG. 5A and FIG. 5B illustrate a section view of a panel installed onto a nacelle inlet, in accordance with various embodiments.
Figure 5B:
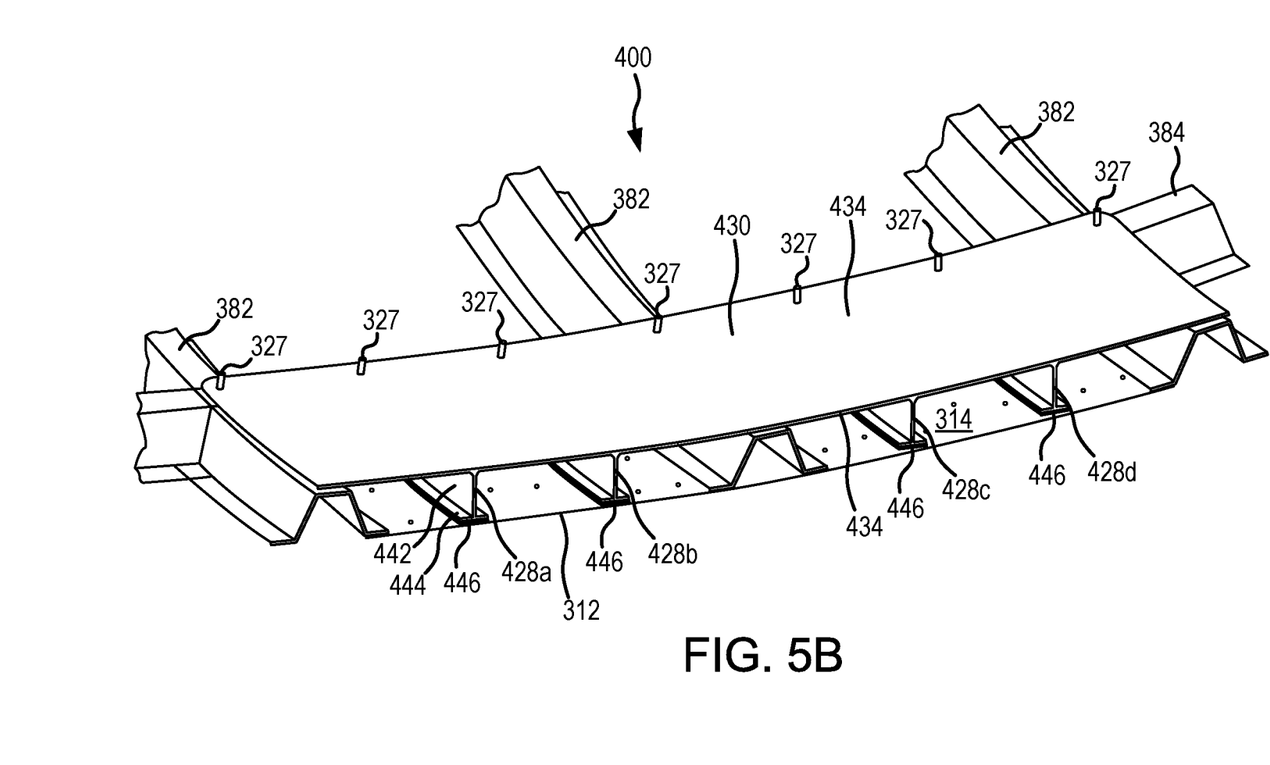

With combined reference to FIG. 5A and FIG. 5B a section view of active laminar flow control arrangement 400 when viewing from the inner surface 314 of outer skin 312 with a plenum panel ("panel") 430 in the installed position is illustrated, in accordance with various embodiments. Panel 430 may comprise a longitudinal wall 434. Panel 430 may comprise one or more division walls (i.e., division wall 428a, division wall 428b, division wall 428c, and division wall 428d) extending from longitudinal wall 434 towards outer skin 312. Longitudinal wall 434 may be spaced apart from outer skin 312 by division walls 428a, 428b, 428c, 428d. The division walls 428a, 428b, 428c, 428d may extend substantially orthogonal from longitudinal wall 434. The division walls 428a, 428b, 428c, 428d may extend substantially parallel with respect to one another.

A strip of sealant 446 may be disposed on each of the division walls (i.e., division wall 428a, division wall 428b, division wall 428c, and/or division wall 428d). Each strip of sealant 446 may be disposed between the associated division wall 428a, 428b, 428c, 428d and inner surface 314. In various embodiments, sealant 346 is a class-B sealant such as a polysulfide-based sealant for example.

The division walls 428a, 428b, 428c, 428d may divide cavity 422 and/or cavity 424 into a plurality of plenums (e.g., plenum 440a, plenum 440b, plenum 440c, plenum 440d, plenum 440e, and plenum 4400. Division wall 428a may divide cavity 422 into plenum 440a and plenum 440b. Division wall 428b may divide cavity 422 into plenum 440b and plenum 440c. Division wall 428c may divide cavity 424 into plenum 440d and plenum 440e. Division wall 428d may divide cavity 424 into plenum 440e and plenum 440f In various embodiments, the division walls are oriented parallel with stiffeners 382.

Laminar flow control arrangement 400 may receive a flow of air through the perforations 390 of outer skin 312 into each plenum (e.g., plenum 340a, plenum 340b, plenum 340c, plenum 340d, plenum 340e, and plenum 340f). In various embodiments, the pressure of air in each plenum varies.

In various embodiments, with particular focus on FIG. 5A, panel 430 may comprise a plurality of indentations 432 extending from longitudinal wall 434 to the end 398 of division walls 428a, 428b, 428c, 428d. Plurality of indentations 432 may provide access to plurality of fasteners 326. In this regard, plurality of indentations 432 may be configured (e.g., sized) to accommodate plurality of fasteners 326. Plurality of indentations 432 may intersect division walls 428a, 428b, 428c, 428d.

With particular focus on FIG. 5B, division wall 428a, division wall 428b, division wall 428c, and/or division wall 428d may comprise a T-shaped structure. With particular focus on division wall 428a, the division walls may comprise a first wall 442 extending substantially orthogonal to longitudinal wall 434 and a second wall 444 extending substantially orthogonal to first wall 442, thereby forming the T-shaped structure. Sealant 446 may be compressed between the division walls and outer skin 312. Sealant 346 may aid in hermetically sealing panel 430 to outer skin 312. Division wall 428a, division wall 428b, division wall 428c, and/or division wall 428d may aid in structurally supporting outer skin 312, particularly against external pressure loading on outer skin 312. Stated differently, division wall 428a, division wall 428b, division wall 428c, and/or division wall 428d may support outer skin 312 from deflecting towards panel 430.

Figure 6:
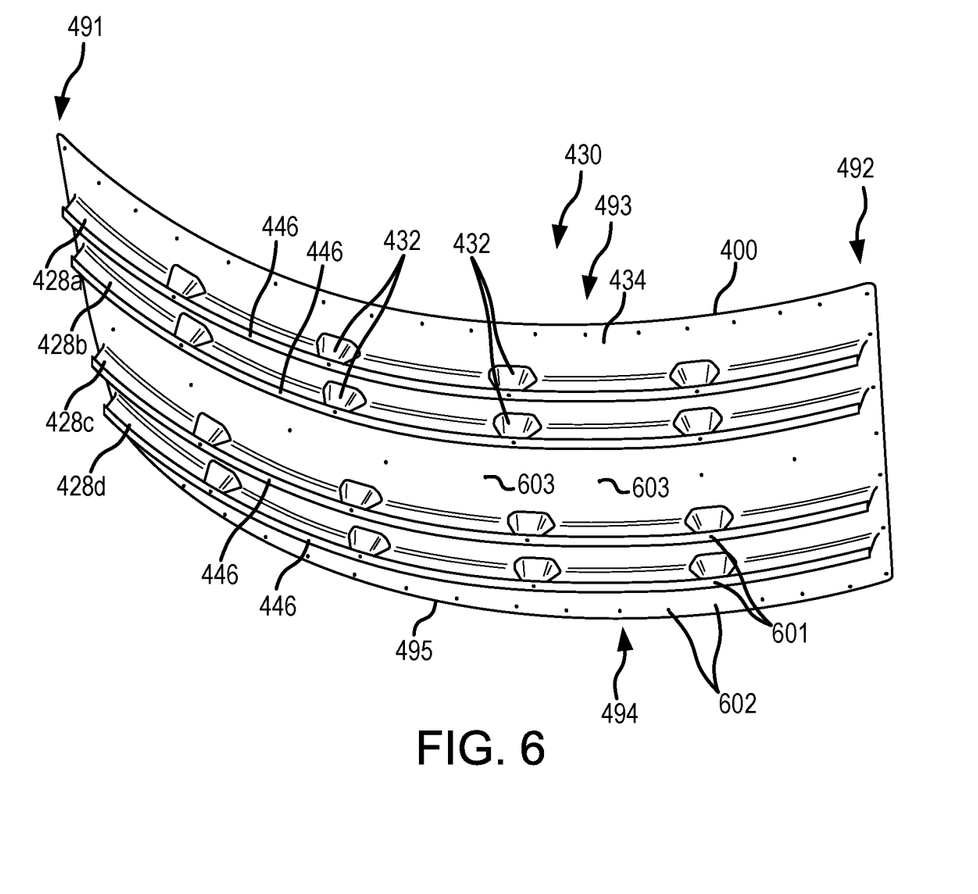
FIG. 6 illustrates a perspective view of a plenum panel, in accordance with various embodiments.

With reference to FIG. 6, a perspective view of panel 430 is illustrated, in accordance with various embodiments. The division walls 428a, 428b, 428c, 428d may extend from a first end 491 of panel 430 to a second end 492 of panel 430. Indentations 432 may be disposed along the associated division walls 428a, 428b, 428c, 428d between first end 491 and second end 492. Longitudinal wall 434 may extend between first end 491 and second end 492. Longitudinal wall 434 may extend between first side 493 and second side 494. Longitudinal wall 434 may define the terminus of panel 430 along the perimeter 495 of panel 430.

In various embodiments, panel 430 may be made of a composite material such as carbon fiber, an aramid fiber, and/or glass fiber. In this regard, panel 430 may be formed during a carbon fiber layup process.

In various embodiments, division wall 428a, division wall 428b, division wall 428c, division wall 428d, and longitudinal wall 334 may comprise a single monolithic piece. In various embodiments, the division walls may be cured to longitudinal wall 334, for example during a carbon fiber composite layup process. In various embodiments, the division walls may be bonded to longitudinal wall 334. It is appreciated that the method of attachment of the division walls to longitudinal wall 334 is not particularly limited.

Panel 430 may comprise a first plurality of apertures 601 disposed at the bottom wall 433 (see FIG. 5A) of each indentation 432. Stated differently, the first plurality of apertures 601 may be disposed along division walls 428a, 428b, 428c, 428d. Fasteners 326 may be received by apertures 601.

Panel 430 may comprise a second plurality of apertures 602 disposed along the perimeter 495 of panel 430. Apertures 602 may extend through longitudinal wall 434. Fasteners 327 may be received by apertures 602.

Panel 430 may comprise a third plurality of apertures 603 disposed along longitudinal wall 434 in between division wall (also referred to herein as a first division wall) 428b and divisional wall 428c. Apertures 603 may extend through longitudinal wall 434. Fasteners 327 may be received by apertures 603. Apertures 603 may be disposed along stiffener 382 in response to panel 430 being in the installed position (see FIG. 5A).

Figure 7:
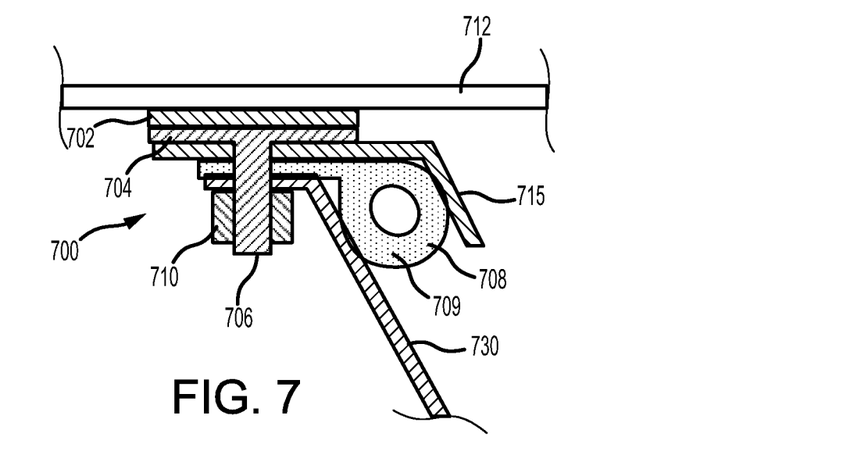
FIG. 7, FIG. 8, and FIG. 9 illustrate a panel coupled to a nacelle structure via an adhesive fastener, in accordance with various embodiments.

With reference to FIG. 7, a panel 730 coupled to a nacelle structure 712 (e.g., stiffener 382, stringer 384, and/or outer skin 312 of FIG. 5A) is illustrated, in accordance with various embodiments. Having mentioned that an outer skin may be coupled to a panel via a fastener such as a rivet, it is further contemplated herein that an outer skin an outer skin may be coupled to a panel via an adhesive fastener 700. Examples of a suitable adhesive fastener may include one or more of the fastening products available from Click Bond, Inc. of Carson City, Nev., USA.

In various embodiments, adhesive fastener 700 may comprise a baseplate 704 and a threaded stud 706 extending from the baseplate 704. The baseplate 704 may be coupled to nacelle structure 712 via an adhesive 702. A seal 708 may be placed around the threaded stud 706 and over baseplate 704. Panel 730 may be fitted around threaded stud 706 and a nut 710 may be threadingly coupled to threaded stud 706 to compress panel 730 between nut 710 and seal 708.

In various embodiments, a liner 715 may be placed over threaded stud 706 an coupled between seal 708 and baseplate 704. A bulb portion 709 of seal 708 may be compressed between liner 715 and panel 730. Liner 715 may be made from a metal material or a composite material. In various embodiments, fasteners 326 and/or fasteners 327 (see FIG. 3B and FIG. 3C) may be similar to adhesive fastener 700.

Figure 8:
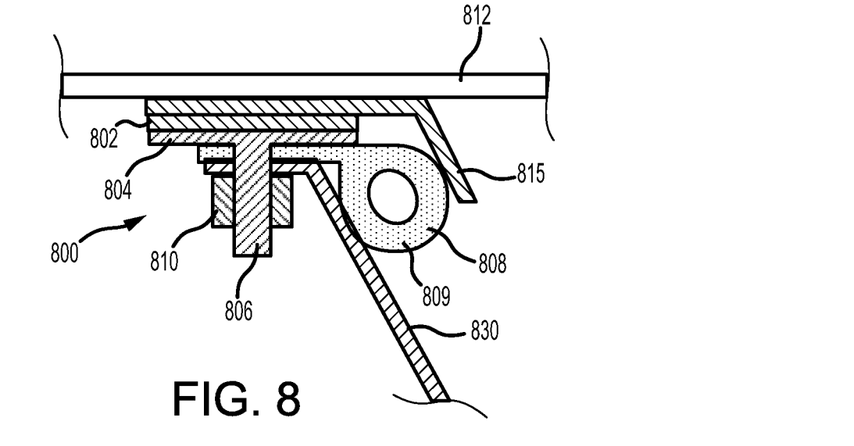

With reference to FIG. 8, a panel 830 coupled to a nacelle structure 812 (e.g., stiffener 382, stringer 384, and/or outer skin 312 of FIG. 5A) via an adhesive fastener 800 is illustrated, in accordance with various embodiments. In various embodiments, adhesive fastener 800 may be similar to adhesive fastener 700 of FIG. 7, except that the liner 815 of adhesive fastener 800 is coupled between baseplate 804 of threaded stud 806 and nacelle structure 812. Bulb portion 809 of seal 808 may be compressed between liner 815 and panel 830. Liner 815 may be made from a metal material or a composite material. Liner 815 may be bonded to nacelle structure 812 via an adhesive. The baseplate 804 may be bonded to liner 815 via an adhesive 802. Panel 830 may be fitted around threaded stud 806 and a nut 810 may be threadingly coupled to threaded stud 806 to compress panel 830 between nut 810 and seal 808. In various embodiments, fasteners 326 and/or fasteners 327 (see FIG. 3B and FIG. 3C) may be similar to adhesive fastener 800.

Figure 9:
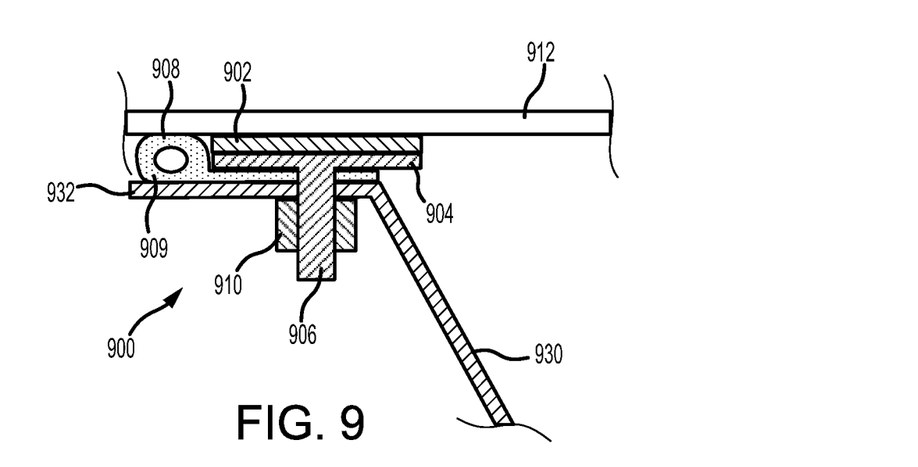

With reference to FIG. 9, a panel 930 coupled to a nacelle structure 912 (e.g., stiffener 382, stringer 384, and/or outer skin 312 of FIG. 5A) via an adhesive fastener 900 is illustrated, in accordance with various embodiments. In various embodiments, adhesive fastener 900 may be similar to adhesive fastener 700 of FIG. 7, except that instead of being compressed between a liner and the panel 930, bulb portion 909 of seal 908 is compressed between flange 932 of panel 930 and nacelle structure 912. The baseplate 904 may be bonded to nacelle structure 912 via an adhesive 902. Panel 930 may be fitted around threaded stud 906. A nut 910 may be threadingly coupled to threaded stud 906 to compress panel 930 between nut 910 and seal 908. In various embodiments, fasteners 326 and/or fasteners 327 (see FIG. 3B and FIG. 3C) may be similar to adhesive fastener 900.

Figure 10:
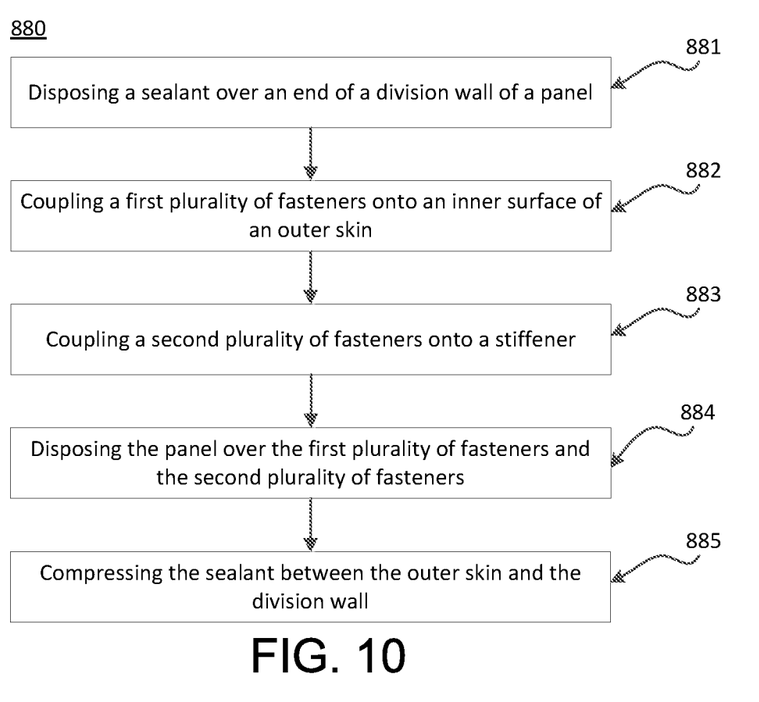
FIG. 10 illustrates a flow chart for a method for installing a laminar flow control arrangement onto a nacelle inlet, in accordance with various embodiments.

With reference to FIG. 10, a method 880 for installing an active laminar flow control arrangement onto a nacelle inlet is illustrated, in accordance with various embodiments. Method 880 includes disposing a sealant over an end of a division wall of a panel (step 881). Method 880 includes coupling a first plurality of fasteners onto an inner surface of an outer skin (step 882). Method 880 includes coupling a second plurality of fasteners onto a stiffener (step 883). Method 880 includes disposing the panel over the first plurality of fasteners and the second plurality of fasteners (step 884). Method 880 includes compressing the sealant between the outer skin and the division wall (step 885).

With combined reference to FIG. 5A and FIG. 10, step 881 may include disposing sealant 446 over end 398 of division wall 428a of panel 430. Step 882 may include coupling first plurality of fasteners 326 onto inner surface 314 of outer skin 312 (see FIG. 4). Step 883 may include coupling second plurality of fasteners 327 onto stiffeners 382 and/or stringer 384 (see FIG. 4). Plurality of fasteners 326 may be coupled to outer skin 312 via an adhesive, such as described with respect to FIG. 7 herein. Plurality of fasteners 327 may be coupled to stiffeners 382 and/or stringer 384 via an adhesive, such as described with respect to FIG. 7 herein.

Step 884 may include disposing panel 430 over the first plurality of fasteners 326 and the second plurality of fasteners 327 (see FIG. 5A). First plurality of fasteners 326 and second plurality of fasteners 327 may extend through apertures disposed in panel 430. Step 884 may include disposing panel 430 over inner surface 314 of outer skin 312 and over stiffeners 382 and/or stringer 384.

Step 885 may include compressing sealant 446 between the outer skin 312 and division wall 428a. Sealant 446 may be compressed between the outer skin 312 and division wall 428a in response to tightening fasteners 326 and/or fasteners 327. Sealant 446 may be compressed between the outer skin 312 and division wall 428a by applying a force, for example by hand or by rollers, to panel 430.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A panel for an active laminar flow control arrangement, comprising:
    a longitudinal wall extending between a first end and a second end of the panel and extending between a first side and a second side of the panel;
    a division wall extending from the longitudinal wall and extending between the first end and the second end;
    a first plurality of apertures disposed along the division wall; and
    a second plurality of apertures disposed along a perimeter of the panel,
    wherein the panel is a single, monolithic piece.

2. The panel for an active laminar flow control arrangement of claim 1, further comprising a sealant disposed on an end of the division wall.

3. The panel for an active laminar flow control arrangement of claim 1, wherein the division wall is T-shaped.

4. The panel for an active laminar flow control arrangement of claim 1, further comprising a second division wall extending from the longitudinal wall and oriented parallel with respect to the division wall.

5. The panel for an active laminar flow control arrangement of claim 1, further comprising a third plurality of apertures disposed in the longitudinal wall between the division wall and the second division wall.

6. The panel for an active laminar flow control arrangement of claim 1, wherein the panel is made from a composite material.

7. The panel for an active laminar flow control arrangement of claim 1, further comprising a plurality of indentations formed into the panel and disposed along the division wall, wherein each indentation extends from the longitudinal wall and intersects the division wall.

8. The panel for an active laminar flow control arrangement of claim 7, wherein each aperture of the first plurality of apertures is located in a bottom wall of each of the indentations, each aperture of the first plurality of apertures is sized to receive a fastener for coupling the panel to an adjacent structure.

9. An active laminar flow control arrangement, comprising:
    an outer skin having an inner surface, an outer surface, and a perforated area;
    a panel coupled to the inner surface; and
    a first plurality of adhesive fasteners adhered to the inner surface of the outer skin and extending through the panel;
    wherein the panel comprises:
        a longitudinal wall extending between a first end and a second end of the panel and extending between a first side and a second side of the panel; and
        a division wall extending from the longitudinal wall and extending between the first end and the second end.

10. The active laminar flow control arrangement of claim 9, wherein the inner surface is in fluid communication with the outer surface via the perforated area.

11. The active laminar flow control arrangement of claim 10, further comprising a sealant disposed on an end of the division wall and the inner surface.

12. The active laminar flow control arrangement of claim 10, wherein the longitudinal wall is oriented substantially parallel with the outer skin.

13. The active laminar flow control arrangement of claim 10, further comprising an indentation formed into the panel and extending from the longitudinal wall and intersecting the division wall.

14. The active laminar flow control arrangement of claim 9, further comprising:
 a structural support arrangement comprising a stiffener disposed at the inner surface of the outer skin; and
 a second plurality of adhesive fasteners adhered to the stiffener and extending through the panel.

15. The active laminar flow control arrangement of claim 9, further comprising a first plenum and a second plenum, the first plenum is divided from the second plenum via the division wall.

16. A method of installing a laminar flow control arrangement onto a nacelle inlet, comprising:
 disposing a sealant over an end of a division wall of a panel;
 coupling a first plurality of adhesive fasteners onto an inner surface of an outer skin;
 coupling a second plurality of adhesive fasteners onto a stiffener; and
 disposing the panel over the first plurality of fasteners and the second plurality of fasteners.

17. The method of claim 16, further comprising compressing the sealant between the outer skin and the division wall, wherein the division wall divides a cavity to at least partially define a first plenum and a second plenum.

* * * * *